Patented June 4, 1935

2,004,066

UNITED STATES PATENT OFFICE 2,004,066

TERTIARY BUTYL ACETIC ACID

Frank C. Whitmore, State College, Pa., August H. Homeyer, St. Louis, Mo., and Walter R. Trent, State College, Pa., assignors to Mallinckrodt Chemical Works, St. Louis, Mo., a corporation of Missouri No Drawing. Application April 17, 1933, Serial No. 666,511

2 Claims. (Cl. 260—112)

This invention relates to carboxylic acids including a carbon atom to which four other carbon atoms are attached, and with regard to certain more specific features, to tertiary butyl acetic acid.

Among the several objects of the invention may be noted the provision of a product tertiary butyl acetic acid of a high degree of purity, and which may be made from commonly obtainable materials with a minimum of complicated procedures; and the provision of a product tertiary butyl acetic acid which is readily reactive as an intermediate in the preparation of several pharmaceutical and other products. Other objects will be in part obvious, and in part pointed out hereinafter.

The invention accordingly comprises the elements and combinations of elements, and features of composition which will be exemplified in the products hereinafter described, and the scope of the application of which will be indicated in the following claims.

As set forth in several copending applications for Letters Patent of the same assignee, it has recently been determined that certain organic products including as a constituent thereof a carbon atom linked to four aliphatic carbon atoms, such as is represented by the type formula:

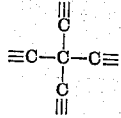

have valuable properties, particularly in the field of hypnotics, sedatives, soporifics, bactericides, and analgesics. This arrangement, whereby a carbon atom is linked to four aliphatic carbon atoms, will hereinafter be referred to as a "neopentyl" arrangement.

One of the most valuable intermediates for the preparation of these neopentyl-including substances comprises tertiary butyl acetic acid, which may be represented by the formula:

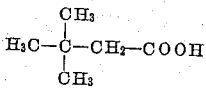

This compound, for example, esterifies in several manners to form esters which are themselves hypnotics and sedatives, and it may be carried through a synthesis whereby it is converted into a higher homologous neopentyl halide which itself constitutes a valuable intermediate for the preparation of hypnotics and the like of a different type.

The only significant reference to tertiary butyl acetic acid in the literature is found in the works of Maurice Delacre, as reported in the Bulletin de la Classe des Sciences, Royale Academie de Belgique for 1906, at pages 7 through 41. Faithful repetition of the work of Delacre, as presented in such report, has led to a serious doubt that Delacre ever succeeded in preparing tertiary butyl acetic acid, at least tertiary butyl acetic acid of such a purity as to permit of its satisfactory use as an intermediate in the manners above set forth. For example, Delacre reports that his product had a melting point of −11° C., and a boiling point of 185 to 190° C., while the tertiary butyl acetic acid of the present invention (as described hereinafter) has, by numerous checks, a melting point of about 7° C., and a boiling point of 183° C. at a pressure of 739 mm., which is comparable to Delacre's pressure.

The tertiary butyl acetic acid of the present invention is made in substantially the following manner:

Diisobutylene (which may be obtained commercially) is first oxidized with a dichromate and sulphuric acid, in the following manner:

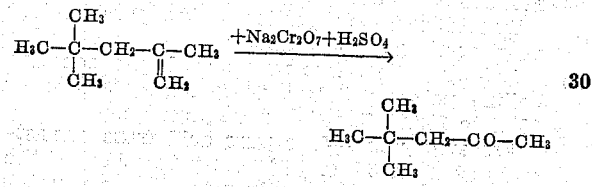

which may be termed 2,2-dimethyl pentanone-4. When, now, this substance is oxidized with a hypohalite the following reaction takes place:

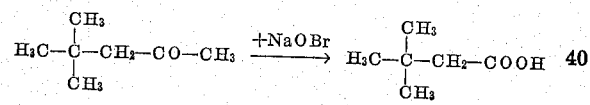

thus yielding the desired tertiary butyl acetic acid.

Example 900 grams of diisobutylene (b. p. about 100° C.) were combined with a solution of 2700 grams of crude sodium dichromate in 3000 cc. of water. To this was added, over a two-day period, a mixture of 2160 cc. concentrated sulphuric acid and 2600 cc. of water. The mixture was then stirred for an additional eight days, making ten days in all. Finally, the mixture was fractionated, and a yield of about 293 grams of 2,2-dimethyl pentanone-4 boiling at about 122 to 126° C. was obtained. Said product had an index of refraction $n_D^{20}$ of about 1.4028.

1000 grams of finely crushed ice and a solution of 525 grams of sodium hydroxide in 2000 cc. of ice-cold water were placed in a three-neck flask fitted with a mercury-sealed stirrer, a dropping funnel, and a thermometer. The flask was surrounded by a bath of ice and salt water. 240 cc. of bromine was then added, through the dropping funnel, over a period of one hour, the sodium hydroxide solution being stirred in the meanwhile. The temperature remained below 0° C. After all of the bromine had been added, 171 grams of the 2,2-dimethyl pentanone-4 made as above were added during ten minutes through the dropping funnel. The temperature of the reaction mixture was —3° C. Two hours after adding the ketone the temperature was 5° C. and the solution was yellow. Four hours later the temperature was 15° C. and the solution was almost colorless. Stirring was continued over night. On the following day the thermometer was replaced by a condenser arranged for distillation, the cooling bath was removed, and the flask was heated by a Bunsen burner. Stirring was continued throughout the distillation, which was stopped when no more oil came over. The distillate amounted to 600 cc. of water and 175 grams of a mixture of bromoform and carbon tetrabromide which was partly solid. After the residue in the flask had cooled, it was acidified by the addition of 600 cc. of concentrated sulphuric acid through the dropping funnel. The delivery end of the dropping funnel dipped below the liquid level in the flask during the acid addition. The mixture was then steam-distilled, the distillate amounting to 1100 cc. The oil layer, which separated, weighed 151 grams. The aqueous layer was extracted with 100 cc. of ether and the ether extract was evaporated, the residue (17 grams) being added to the oil fraction. The acid product thus obtained was dried and purified by fractionation at reduced pressure (about 25 mm.), all matter coming over between 95 and 96° C.

The following properties of the pure tertiary butyl acetic acid were noted:

*Boiling point.*—The pure acid had a constant boiling point of 96° C. at 26 mm. pressure, or 183.0 to 183.3° C. at 739 mm. pressure.

*Freezing point.*—The pure acid froze consistently at from 6.3 to 7.0° C. On fractions of the acid not quite so carefully purified, the freezing point dropped to approximately 0° C.

*Index of refraction.*—The index of refraction of the pure acid $n_D^{20}$ was determined to be about 1.4096.

*Density.*—The density of the pure acid appears to be about $d_{20}^{20}$ as 0.9140 and $d_4^{20}$ as 0.9124.

*Molecular refraction.*—Calculated from the above index of refraction and density, about 31.48. This substantially checked the theoretical value calculated from the atomic refractions of Eisenlohr, which is 31.46.

*Physical form.*—At room temperatures, a heavy colorless oily liquid. The solid form is white and has a needle-like crystalline structure.

The above shows conclusively that a pure tertiary butyl acetic acid having the formula $(CH_3)_3C-CH_2-COOH$ has been formed, and that it is a different substance from the alleged tertiary butyl acetic acid of Delacre.

In view of the above, it will be seen that the several objects of the invention are achieved and other advantageous results attained.

As many changes could be made in carrying out the above compositions without departing from the scope of the invention, it is intended that all matter contained in the above description shall be interpreted as illustrative and not in a limiting sense.

We claim:

1. Tertiary butyl acetic acid having approximately the following properties:

| | |
|---|---|
| Boiling point | 183° C. at 739 mm. |
| Freezing point | 6.3 to 7.0° C. |
| Index of refraction, $n_D^{20}$ | 1.4096 |
| Density— | |
| $d_{20}^{20}$ | 0.9140 |
| $d_4^{20}$ | 0.9124 |

2. Tertiary butyl acetic acid having approximately the following properties:

| | |
|---|---|
| Boiling point | 183° C. at 739 mm. |
| Freezing point | 6.3 to 7.0° C. |

FRANK C. WHITMORE.
AUGUST H. HOMEYER.
WALTER R. TRENT.